US010343456B2

(12) United States Patent
Novoplanski

(10) Patent No.: US 10,343,456 B2
(45) Date of Patent: Jul. 9, 2019

(54) TIRE FOR SURFACE VEHICLE

(75) Inventor: Avishay Novoplanski, Moshav Beit-Zait (IL)

(73) Assignee: GALILEO WHEEL LTD., Lod (IL)

( * ) Notice: Subject to any disclaimer, the term of this patent is extended or adjusted under 35 U.S.C. 154(b) by 707 days.

(21) Appl. No.: 14/235,136

(22) PCT Filed: Jul. 26, 2012

(86) PCT No.: PCT/IL2012/050277
§ 371 (c)(1),
(2), (4) Date: Jan. 27, 2014

(87) PCT Pub. No.: WO2013/014676
PCT Pub. Date: Jan. 31, 2013

(65) Prior Publication Data
US 2014/0158268 A1 Jun. 12, 2014

Related U.S. Application Data

(60) Provisional application No. 61/671,981, filed on Jul. 16, 2012, provisional application No. 61/512,180, filed on Jul. 27, 2011.

(51) Int. Cl.
*B60C 9/22* (2006.01)
*B60C 17/08* (2006.01)
(Continued)

(52) U.S. Cl.
CPC .............. *B60C 3/00* (2013.01); *B60C 3/04* (2013.01); *B60C 5/008* (2013.01); *B60C 7/14* (2013.01);
(Continued)

(58) Field of Classification Search
CPC .... B60C 3/00; B60C 3/04; B60C 3/08; B60C 17/08; B60C 9/22; B60C 9/2204;
(Continued)

(56) References Cited

U.S. PATENT DOCUMENTS 595,422 A * 12/1897 Van Zandt ................ 152/522 X
597,569 A * 1/1898 Van Zandt ................ 152/454 X
(Continued)

FOREIGN PATENT DOCUMENTS

CN          1729110 A    2/2006
CN        101239639 A    8/2008
(Continued)

OTHER PUBLICATIONS

English machine translation of FR 2.219.022 A, Sep. 20, 1974.*
(Continued)

*Primary Examiner* — Adrienne C. Johnstone
(74) *Attorney, Agent, or Firm* — Browdy and Neimark, P.L.L.C.

(57) ABSTRACT

A wheel assembly for a surface vehicle is presented. The wheel assembly comprises a tire comprising an envelope structure which by its inner surface encloses a cavity. The envelope structure comprises an outer, surface-engaging side having a circumferential surface, and opposite side walls which are integral with and extend from the surface-engaging side. The sides walls by their free ends define an inner, rim-engagement side of the tire by which the tire is connectable to a wheel hub. Each of the opposite side walls comprises a surface pattern defining a suspension assembly within the side wall to thereby prevent stretching of the tire envelope towards its maximal volume when the envelope is compressed with gas, while allowing deformation of the tire envelope when loaded or depressurized such that the surface engaging side of the tire maintains a substantially constant contact with the surface.

6 Claims, 15 Drawing Sheets

(51) Int. Cl.
  *B60C 3/04* (2006.01)
  *B60C 3/00* (2006.01)
  *B60C 7/14* (2006.01)
  *B60C 5/00* (2006.01)
  *B60C 11/03* (2006.01)

(52) U.S. Cl.
  CPC ............... *B60C 9/22* (2013.01); *B60C 17/08* (2013.01); *B60C 2009/2219* (2013.01); *B60C 2011/0313* (2013.01); *Y10T 152/10045* (2015.01); *Y10T 152/10117* (2015.01)

(58) Field of Classification Search
  CPC ..... B60C 2009/2219; Y10T 152/10009; Y10T 152/10045; Y10T 152/10117; Y10T 152/10126
  USPC ....... 152/454, 522, 152, 156, 165–166, 457, 152/531
  See application file for complete search history.

(56) References Cited

U.S. PATENT DOCUMENTS

| | | | |
|---|---|---|---|
| 1,462,440 A | | 7/1923 | Bauman |
| 1,832,405 A | | 11/1931 | Mayer |
| 2,331,024 A | | 10/1943 | Griffith |
| 2,463,226 A | | 3/1949 | Walden |
| 2,491,698 A | | 12/1949 | Walden |
| 2,786,507 A | * | 3/1957 | Howe |
| 2,798,525 A | | 7/1957 | Mantzel |
| 3,111,975 A | * | 11/1963 | Mayeau |
| 3,242,965 A | * | 3/1966 | Mirtain ........................ 152/531 |
| 3,394,751 A | | 7/1968 | Sidles et al. |
| 3,400,746 A | | 9/1968 | Heimovics, Jr. |
| 3,457,981 A | | 7/1969 | Verdier |
| 3,590,897 A | | 7/1971 | Bragdon |
| 3,698,461 A | | 10/1972 | Markow |
| 3,805,868 A | | 4/1974 | Tangorra |
| 3,840,060 A | | 10/1974 | Tangorra |
| 4,061,171 A | * | 12/1977 | Boileau .................... B60C 3/04 152/454 X |
| 4,137,960 A | | 2/1979 | Cataldo |
| 4,308,907 A | | 1/1982 | Monzini |
| 4,739,810 A | | 4/1988 | Markow |
| 6,422,576 B1 | | 7/2002 | Michaeli et al. |
| 7,281,558 B2 | | 10/2007 | Lopez |
| 7,334,850 B2 | | 2/2008 | Spector et al. |
| 7,547,078 B2 | | 6/2009 | Spector et al. |
| 7,726,371 B2 | | 6/2010 | Morrison |
| 2004/0140708 A1 | | 7/2004 | Bott et al. |
| 2008/0197695 A1 | | 8/2008 | Uemura |
| 2009/0173421 A1 | | 7/2009 | Love et al. |

FOREIGN PATENT DOCUMENTS

| | | | |
|---|---|---|---|
| DE | 66733 C | | 2/1892 |
| DE | 209209 C | | 4/1909 |
| DE | 1073332 | | 1/1960 |
| DE | 2135960 A1 | | 2/1973 |
| DE | 2 406 309 A | * | 8/1974 |
| DE | 29702598 U1 | | 4/1997 |
| EP | 0 374 081 A2 | | 6/1990 |
| EP | 0858760 A1 | | 8/1998 |
| FR | 2.219.022 A | * | 9/1974 |
| GB | 1380267 A | | 1/1975 |
| GB | 2065040 A | | 6/1981 |
| JP | 2001121929 A | | 5/2001 |
| JP | 2003136921 A | | 5/2003 |
| JP | 2010519128 A | | 6/2010 |
| NL | 41125 C | | 2/1937 |
| WO | 03/001957 A1 | | 1/2003 |
| WO | 05063505 A1 | | 7/2005 |
| WO | 2011/092709 A1 | | 8/2011 |

OTHER PUBLICATIONS

Office action dated Jul. 15, 2015, in corresponding application No. EP12818321.

European Search Report EP14188573 dated Mar. 9, 2015.

* cited by examiner

TIRE FOR SURFACE VEHICLE

TECHNOLOGICAL FIELD AND BACKGROUND

This invention relates to a tire and/or wheel assembly for a vehicle, aimed at improving the propelling of a surface vehicle.

It is generally known that in order to provide effective maneuverability of a surface vehicle, its rim-mounted tires should be inflated to their inflation pressure, while puncture of a tire envelope especially in the sidewall of such tire may cause a very rapid loss of internal inflation pressure. Known techniques aimed at solving a problem of driving the vehicle upon deflation of its tire are associated with the provision of sensors or deflation warning devices capable of earlier detection of a change in the gas pressure within the tire in order to warn the user of a loss of pressure, as well as provision of various facilities for delaying effects of puncture on tires for as long as possible. For example, a tire of the conventional type may be provided thereinside with various elements, some including elastomers such as rubber polyurethanes and others, such that, in the event of puncture of the main outer tire or loss of pressure by the latter, the inner structure might serve as a support for the outer tire. Devices are also known which are placed inside the tire and which, though not inflated in normal use, may reduce pressure loss in the tire in the event of puncture of the latter. Moreover in a standard tire there is a strong dependency between the pressure and the tire ability to withstand torque and lateral forces, i.e. the less internal pressure in a standard tire the less stable it will be and its accurate steering ability will be reduced.

General Description

The present invention provides a novel locomotion assembly which can be used for carrying and propelling a surface vehicle. More specifically, the present invention provides a novel approach for the configuration of a surface vehicle's tire. The tire of the invention may be configured as gas envelope, while in some embodiments the gas can be air. The configuration of the tire of the present invention is such that the technological procedure associated with the tire inflation may be eliminated or at least significantly reduced.

In this connection, the following should be understood. As indicated above, in order to provide effective maneuverability of a surface vehicle, its wheel assembly should be substantially flexible in order to deform, and while deforming the wheel assembly would better follow the contact surface allowing for better traction and at the same time the flexibility will allow for shock absorption that contributes both to ride comfort and general stability and safety of the vehicle. In many cases the flexibility is gained by using gas (mostly air) inflating the tire. A standard tire consists of a closed inflated flexible envelope, where the gas/air stretches the envelope substantially to its full radial dimension therefore defining substantially the largest potential volume for the given envelope, any flexibility or deformation in such tire envelope involves deflection and stretching in the surface of the envelope. The deformation generates heat and causes fatigue resulting in wear-out and energy loss. Moreover, the way that said deformation accrued, will not allow sufficient contact between the deflected area of the tire (the contact patch of the tire tread) and the surface, as will be described further below.

The present invention provides a semi-flexible envelope that by mathematical definition defines a volume that is substantially smaller than the theoretical volume which such envelope can potentially define, i.e. when compressed with gas the envelope is limited by its unique structure thus preventing stretching towards its maximum volume. Moreover, the profile of the envelope allows deformation of the tire when loaded or when depressurized in a way that the tread part of the tire maintains a good constant contact with the surface, as well as maintains its ability to deliver torque and bear side forces from the vehicle to the ground, and generates substantially less heat while doing so.

The sidewall of the tire of the present invention presents a combination of curved surfaces. To this end, a combination of curved surfaces can be described as a combined surface formed by an infinite number of points that maintain a relation between them, i.e. relative distance to one another along the surface, such that curving or folding of the surface will not change the relation between the points along the surface, and therefore will not involve stretching or deflection in the surface. In contrary, the sidewall of a standard tire can be defined as a spherical surface which can be described as an infinite number of points that maintain singular relation, i.e. any change in the sphere will result in a change in relation between some of the points, and will thus involve stretching and deflection, that in many cases generate heat and may cause fatigue in the surface material.

Thus, by one broad aspect of the invention there is provided a wheel assembly for a surface vehicle, comprising a tire envelope configured to be mountable on a wheel hub, the tire envelope by its inner surface defining a gas cavity having a certain maximal volume defined by a geometry of the envelope (namely the maximal volume achievable in the absence of structural constraints), wherein the tire envelope comprises or defines a suspension assembly within its side walls (e.g. a suspension assembly embedded in side walls of the tire envelope). Consequently under gas pressure in said cavity the volume achievable through gas-pressure imposed expansion is substantially smaller than said maximal volume defined by the geometry of the envelope.

The tire of the present invention can be filled by gas/air to better suspend a vehicle, but has no such requirement for delivering torque or to withstand side forces. The tire can be designed to operate as pneumatic tire while using the gas/air as a suspension shock absorbent, however it may function safely with no gas/air, being designed as a non-pneumatic wheel and exploiting its structure to deliver torque and bear side forces. The non-pneumatic configuration is useful also in cases when gas/air cannot be used or its use is undesirable, such as in a Luna vehicle for example.

The tire has an outer, surface-engaging side (termed "tread", having a circumferential surface), and opposite side surfaces/walls which are integral with and extend from the surface-engaging side and by their free ends define an inner, rim-engagement side, of the tire by which the tire is connectable to the locomotion assembly. According to the invention, each of the opposite side walls of the tire has a pattern in the form of a surface relief, which in some embodiments defines at least one groove which has a substantially V-shaped cross-section and is located between the surface-engaging side (tread) and the rim-engagement side. Such a groove with substantially V-shaped cross section is referred to below as a V-shaped groove. It can also be described as if each V shape groove divides the sidewall into 2 two-dimensional curved surfaces.

Thus, by such embodiments the side wall has a surface pattern defining one or more V-shaped grooves extending between the surface engaging side and the ring-engagement side (i.e. along the radial axis of the tire). The provision of such grooves which are made in a generally flexible/elastic tire material and which have substantially round apexes provides the tire with a desired suspension assembly. This allows the tire (locomotion assembly) containing very low air pressure (even zero pressure inside) to be still able to withstand forces and rotate and drive the vehicle with sufficient maneuverability.

Generally, the required V-shape geometry of the groove may be achieved by any suitable apex angle. In some embodiments, the intersecting sides of the V-shape groove are formed by a pair of opposite segments of substantially frustum-conical structures (or generally conoid structures). The general concept of using frustum-conical structure in locomotion assembly of a surface vehicle is described in the International (PCT) application No. PCT/IL2011/000115, which is assigned to the assignee of the present application. According to this technique, the locomotion assembly has a frustum-conical structure including at least one pair of flexible members each having a frustum-conical surface extending between its relatively narrow and wide ends along a frustum-conical axis. The frustum-conical members of the pair are arranged in a substantially symmetric manner and are rotatable about a common axis coinciding with their frustum-conical axes. Each frustum-conical member is reversibly deformable from its biased rounded shape corresponding to a frustum-conical shape in which its side elevation is circular into a deformed frustum-conical shape in which its side elevation is non-circular. The frustum-conical members of the pair are configured and operable such that a bias of each of the frustum-conical members to induce the surface engaging member to move in a non-linear direction is offset by the other frustum-conical member of the pair'.

According to the present invention, the tire constitutes a wheel-tire unit which may be constituted just by the above described envelope structure of elastomeric material composition (or semi elastomeric materials) enclosing a cavity/lumen which may or may not be filled by gas medium. The tire is preferably configured to have desired rigidity and flexibility distribution along and across its sides. To this end, rigidity and flexibility may be different at different regions of the side wall, i.e. the side walls might have a certain rigidity/flexibility pattern at least along the radial axis (radial pattern) of the tire and in some embodiments a further rigidity/flexibility pattern along the circumference of the side wall (circumferential pattern). These different levels of rigidity and flexibility can be achieved by several ways, which may include implantable/embedded rigid material such as plastics, steel, spring etc., the rigidity may be gained by forming a 'beam' structure using combination of non streaking elements such as cables, or cords such as textile cords nylon, Kevlar, etc. and/or relatively hard/stiff elastomers such as hard rubber, as will be described more specifically further below.

In case the envelope is filled with compressed gas/air, the structure has to eliminate the gas from bulging the envelope to define the biggest possible volume it can. Therefore a certain restrain has to be set in order to keep the desired shape of the envelope. The inner part of the groove (closer to the rim/hub engagement side of the tire) tends to increase its diameter. Therefore, constructing the inner side of the groove with un-stretchable elements will support the envelope structure, preventing the inner side from 'bulging' out.

Moreover, in order for the inner and outer sides of the groove to withstand the gas/air pressure, both the inner and outer sides of the groove are sufficiently rigid along the radial axis of the tire. In some embodiments of the invention, it is desirable to maintain the radial rigidity of the groove sides but at the same time to gain circumferential flexibility, therefore the groove structure might be strengthened in an uneven way so it may contain relatively rigid elements only along the radial axis, or it may be designed in a way that an array of pattern elements (slots, projections, thinner regions) is provided which are arranged in a spaced-apart relationship circumferentially around the groove side(s) thereby weakening the circumferential structure while keeping the radial rigidity. A similar principle may be applied where an array of bulges extend circumferentially around the groove side(s) providing similar results.

Thus, the tire may have a certain rigidity pattern across its side walls, i.e. between the surface-engaging and rim-engagement sides. This pattern is defined by that the apex of the groove and its corners at opposite sides of the groove are sufficiently elastic (e.g. achieved by making the tire with smaller thickness within these regions) as compared to the tire regions between them. As a result, the two parts of the groove function as two beams that can be bended but not deformed. The general shape of such grooved tire is maintained and any change is reversible. On the other hand, the tire should have sufficient flexibility to absorb the forces falling on it while not breaking down. Additionally, the inner side of the groove might have a relatively higher rigidity, with respect to both "radial" and "circumferential" rigidities, in order to maintain the generally wheel-like shape of the tire, and the outer part of the groove (closer to the surface-engaging side of the tire) might be of relatively lower rigidities.

Thus, the desired combination of rigidity and flexibility can be achieved by the provision of appropriate rigidity pattern in the generally flexible material of the tire, i.e. higher radial and circumferential rigidity at the inner part of the groove than that of the outer part, while securing three flexing points along the radial direction, i.e. at the apex and corners at opposite sides of the V-shaped groove. As indicated above, a second rigidity pattern can be provided as a circumferential pattern along the circumferential direction of the inner and outer parts of the groove. This may be achieved by an array of spaced-apart slots (e.g. regions with implanted material of different rigidity than in spaces between the slots and/or uneven wall thickness) arranged along the groove with the slots' orientation being substantially perpendicular to the tire plane (across the groove). Thus, the tire with such groove extending along its circumference has a first rigidity pattern in a radial direction of the tire (across the groove) and possibly also a second rigidity pattern in a circumferential direction.

Thus, according to another broad aspect of the invention, there is provided a tire envelope for a surface vehicle, comprising a surface pattern in its side walls extending between a surface-engaging side and a rim-engagement side of the tire, said surface pattern configured as a suspension assembly embedded in the side walls to thereby prevent stretching of the tire envelope towards its maximal volume when the envelope is compressed with gas, while allowing deformation of the tire envelope when loaded or depressurized such that the surface engaging side of the tire maintains a substantially constant contact with the surface.

According to yet another broad aspect of the invention, there is provided a tire for a surface vehicle, the tire comprising an envelope structure which by its inner surface encloses a cavity, said envelope structure comprising an outer, surface-engaging side having a circumferential surface, opposite side walls which are integral with and extend from said surface engaging side, the sides walls by their free ends defining an inner, rim-engagement side of the tire by which the tire is connectable to a locomotion assembly, wherein each of the opposite side walls comprises a surface pattern extending between the surface-engaging side and the rim-engagement side and defining a surface relief in the form of at least one groove having substantially V-shaped cross section, and wherein each of the side walls is configured with a predetermined rigidity pattern across the side wall.

The rigidity pattern may comprise relatively small rigidity and thus relatively high flexibility of regions of the tire at apex of the V-shaped groove and corners defined by connection between the groove with respectively the surface engaging side and the rim engagement side of the tire.

The rigidity pattern may comprises different rigidities of the tire within respectively an outer side of the groove closer to the surface engaging side and an inner side of the groove closer to the rim engagement side of the tire. For example, the inner side of the groove comprises an array of support elements embedded therein and extending along at least one of radial and circumferential axes of the tire.

The surface engaging side is configured to have predetermined rigidity along a circumferential axis of the tire. To this end, the surface engaging side may comprise an array of support elements embedded therein.

Alternatively or additionally, the rigidity pattern may be formed by varying thickness of at least one of the outer and inner sides of the groove.

Generally speaking the grooved side walls of the tire and appropriate rigidity/flexibility distribution of the tire material within the tire creates an optimal suspension assembly allowing the effective operation of a locomotion assembly using such tire with practically no limitations to the lack/reduction of pressure in the tire cavity.

As indicated above, the tire regions at the apexes of the grooves (and outer corners) are relatively flexible. It has been realized in accordance with an embodiment of this invention that in a deformable wheel the flexible portions of the side walls (particularly at said apexes), considerable strains may develop. The present invention offers a solution to reduce such strains by providing a specifically designed load-bearing arrangement.

The present invention thus in its yet further aspect provides a deformable wheel assembly with an inflatable enclosure defined by the above described tire, and a load-bearing arrangement formed by a plurality of support elements, comprising a first array of spaced-apart elements and a second array of spaced-apart elements, the elements in each of the arrays defining together a substantially frustum-conical structure (i.e. the lines that link defined points at distal ends of the elements together define a frustum-cone), the two frustum-conical structures intersecting one another with the elements of one dove-tailing those of the other structure.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
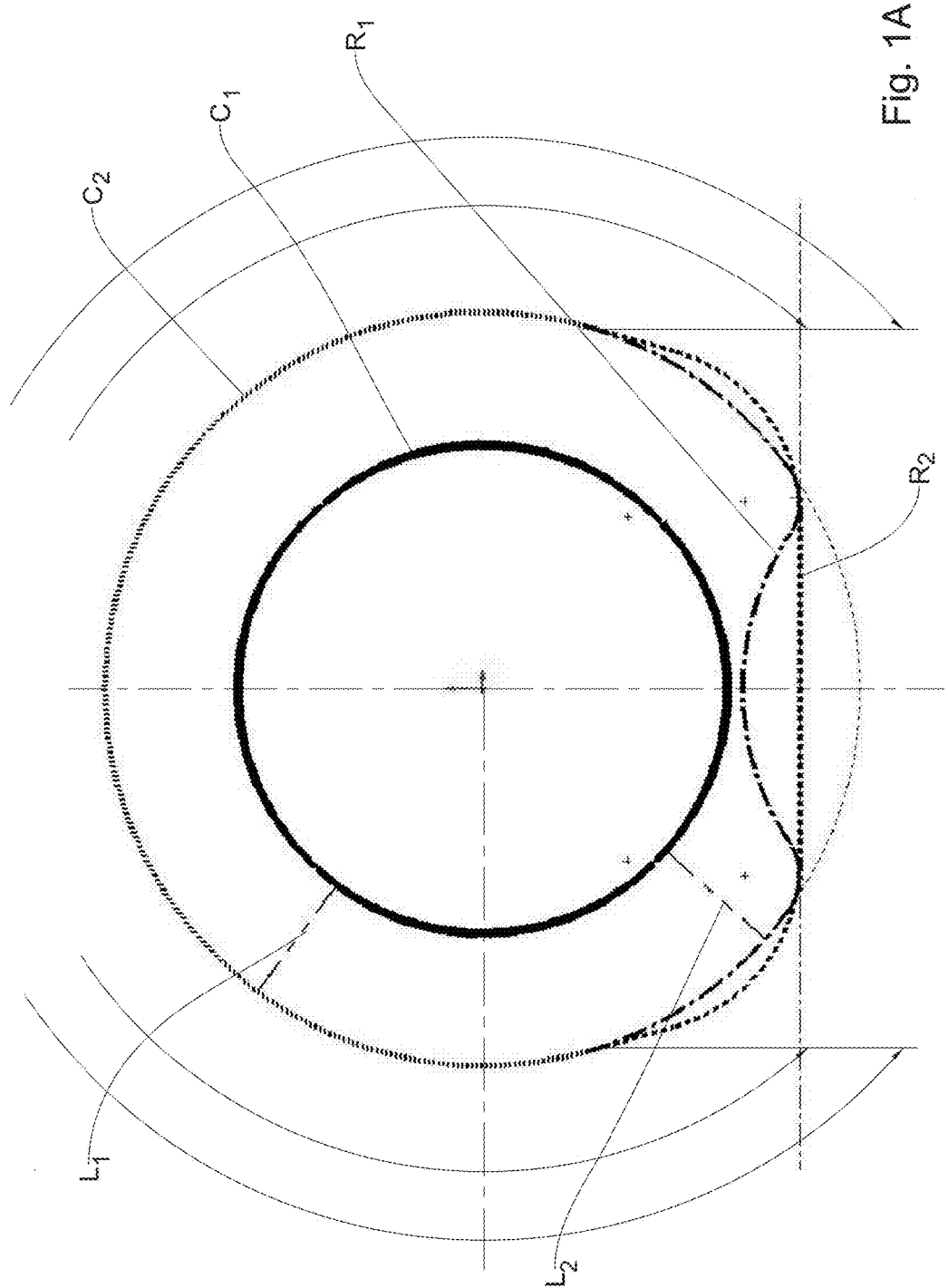
FIG. 1A illustrates the typical behavior of a traditional tire when being loaded, as compared to that utilizing the tire of the invention having grooved side walls.

In order to better understand the features of the tire configured according to the present invention, utilizing the V-shape groove structure described above, reference is made to FIGS. 1A to 1C describing the physical reason that is behind the typical behavior of a traditional tire (regardless of its size or cross section) as compared to the tire of the present invention. FIG. 1A shows a tire in its loaded and unloaded states. In the figure, a circle $C_1$ in the middle with diameter 620 constitutes a rim, a circle $C_2$ is the unloaded tire, and lines $L_1$ and $L_2$ between the rim $C_1$ and the outer circumference of the unloaded tire $C_2$ indicate the line of the tire sidewall in a normal tire. The sidewall in the fully inflated tire defines the maximal distance between the outer circumference and the rim, i.e. the outer circumference under any condition cannot breach the outer diameter of the tire. Curve $R_1$ corresponds to a condition of a conventional tire when deflated, while curve $R_2$ corresponds to that of a tire in accordance of the present invention when deflated.

When air is discharged from the tire, the tire will collapse (under the vehicle weight) and the rubber will have to be displaced somewhere. Since the circumferential dimension cannot increase the original diameter (lines $L_1$ and $L_2$), the rubber will shrink and compress a little bit and will increase the footprint a bit. If the tire is further deflated, it will have to collapse, and since it cannot collapse outside, it will collapse inside as shown by curve $R_1$. When the same occurs with the tire of the present invention, the outer circumference will be pushed away (under the load), and, since it has no limitation (the sidewall here is actually the "wall of the cup" and is almost horizontal, and it can 'get away' from the rim), it will deform to absorb and receive the shape of the ground, as by curve $R_2$.

Figure 1B:
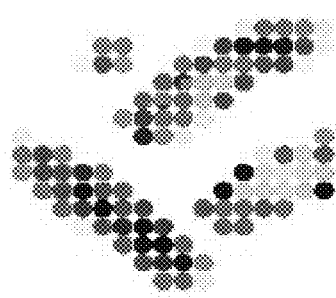
FIGS. 1B and 1C illustrate the footprint of the locomotion assembly utilizing the tire of the present invention in respectively loaded and unloaded state of the tire.
Figure 1C:
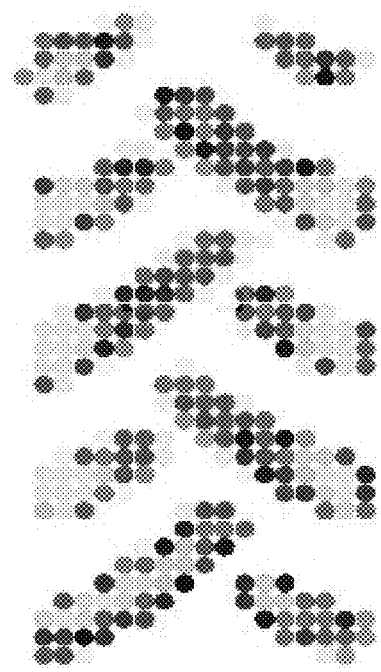

FIGS. 1B and 1C show the footprint of the tire of the present invention in respectively, inflated and deflated states thereof. As can be seen, a 200% increase in footprint is achieved.

Figure 2A:
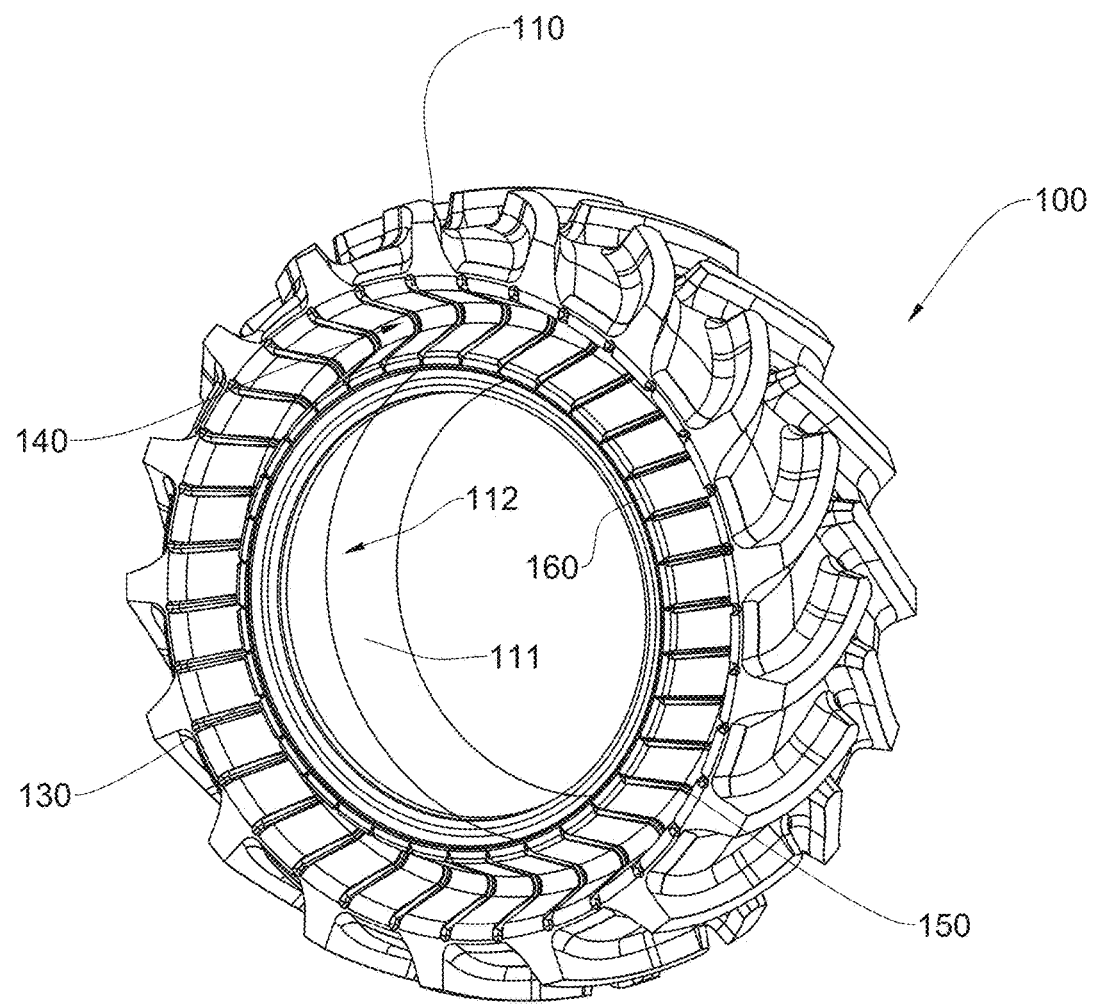
FIG. 2A illustrates an example of the tire of the present invention.
Figure 2B:
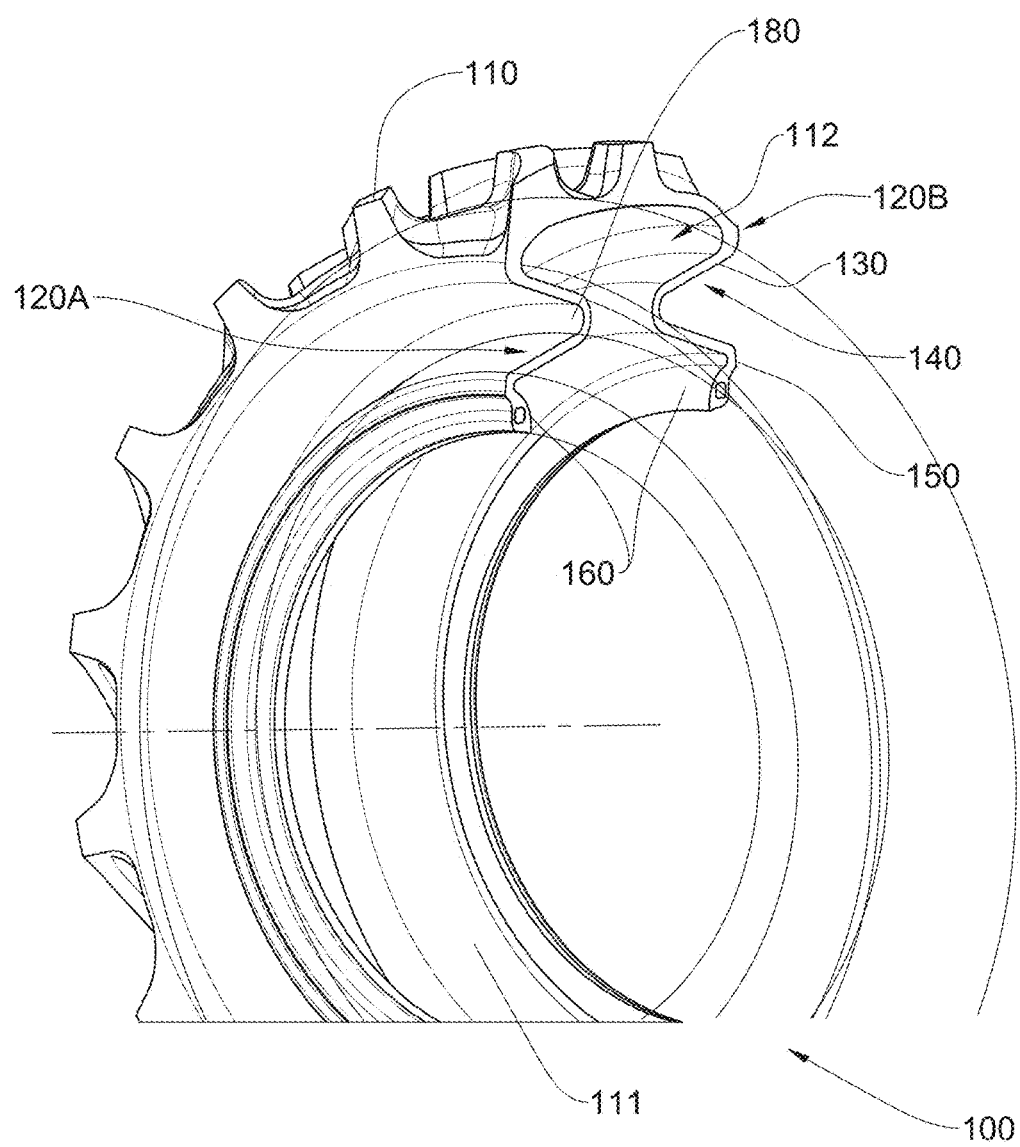
FIGS. 2B and 2C show more specifically an example of the pattern provided in the side walls of tire of the present invention.
Figure 2C:
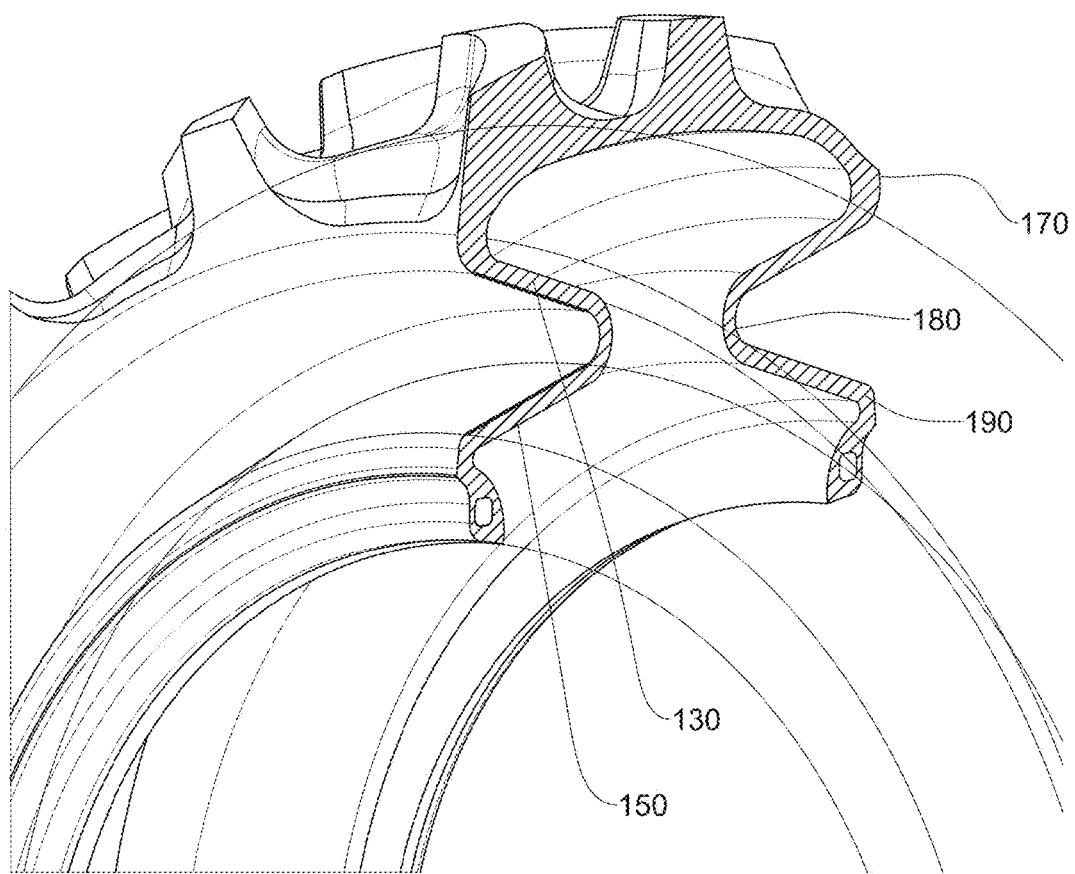

Reference is now made to FIGS. 2A to 2C, illustrating tires configured according to the invention. FIG. 2A shows the tire 100 which is configured as an envelope structure whose inner surface 111 encloses a cavity 112. The latter may be filled by gas, e.g. air. Generally, the tire may or may not be inflatable (i.e. pneumatic). The tire envelope 100 has an outer, surface engaging side 110 (tread, having a circumferential surface), opposite outer edges of the surface-engaging side 110 parallel to the rotation axis of the tire forming shoulders 170, and opposite side walls 120A and 120B which are integral with the surface engaging side 110 and extend therefrom. The side walls by their free ends 160 are connectable to a rim of a locomotion assembly (not shown) and thus actually define a rim engagement side. According to the invention, each of the opposite side walls 120A and 120B has a surface pattern defining at least one substantially V-shaped groove 140 between the surface engaging side 110 and the rim engagement side 160. In the present not limiting example, a single-groove pattern is provided in each side wall.

The groove 140 has inner and outer sides 150 and 130 intersecting at the groove apex 180. As better seen in FIG. 2B, the outer side 130 of the groove is connected to the surface engaging side 110 via a corner region 170 of the tire envelope 100, and the inner side 150 of the groove is connected to the rim engagement side 160 via another corner region 190 of the envelope 100. The configuration is such that these corner and apex regions 170, 180 and 190 have lower rigidity and higher flexibility/elasticity than the inner and outer sides of the groove. Thus, each of the side walls 120A, 120B, has a surface pattern forming at least one V-shaped groove, and also has a rigidity pattern extending across the side wall (i.e. along radial axis) of the tire. As also shown in the figure, the tire at its rim engagement side 160 is typically formed with non-stretchable circumferential member (bead) that secure the tire to the rim and in most cases is constructed from steel cords.

Preferably, the side walls 120A and 120B have additional rigidity pattern defined by different rigidities of the inner and outer sides 150 and 130 of the groove 140. More specifically, the inner side 150 of the groove 140, by which it is connected to rim engagement side 160 of the tire 100 has higher rigidity than the outer side 130 of the groove connected to the surface engaging side 110 of the tire. The inner side 150 has higher rigidity than the outer side 130 along both radial and circumferential axes.

Figure 3:
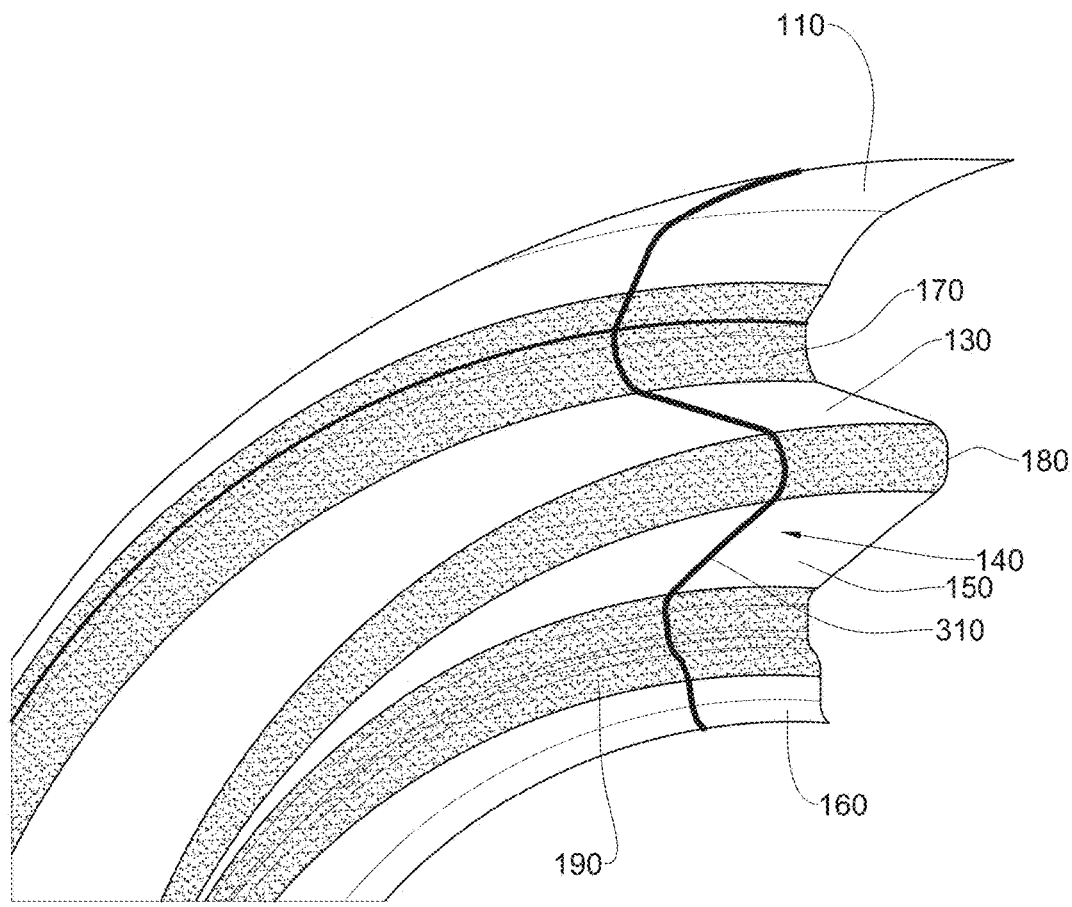
FIG. 3 illustrates an example of the geometrical and rigidity patterns provided in the tire of the present invention.

FIG. 3 shows more specifically the surface and rigidity patterns. As shown, these patterns extend along a path 310, i.e. across the side wall 120A, which can generally be defined as "radial axis" of the tire 100. One of the patterns is in the form of a surface relief defined by the provision of at least one groove 140, and the other pattern is the rigidity pattern along the path 310 (e.g. material composition). The rigidity pattern is formed at least by providing lower rigidity at the corners 170, 190 and apex 180, and possibly also by different rigidities of the outer and inner sides 130 and 150 of the groove.

Generally, the rigidity pattern across the side wall may be achieved by using different materials or the same material, such as rubber, that has undergone different degrees of hardening processes and/or has different thicknesses. The rigidity pattern may be produced by embedding a support structure within the tire. The support structure is typically in the form predetermined arrangement of support elements, such as cables, fabrics, cords, textile, micro fibers. The support elements are oriented with respect to circumferential and radial axes in order to provide the desired rigidity and flexibility distribution in the tire, which provide for securing the circumferential length all along the cross section of the tire defined by path 310 from the rim engagement side (bead) 160 to the surface engaging side (tread) 110, as well as maintain circumferential flexibility along the same cross section. Also, the rigidity and flexibility distribution should be selected to maintain radial rigidity over the inner and outer sides (cones) 150 and 130 while keeping the sufficiently flexing points at the corner regions, i.e. region 190 between the groove and bead, region 180 between the inner and outer sides (i.e. the groove apex region), and region 170 (so-called "shoulder") between the groove and tread.

Figure 4A:
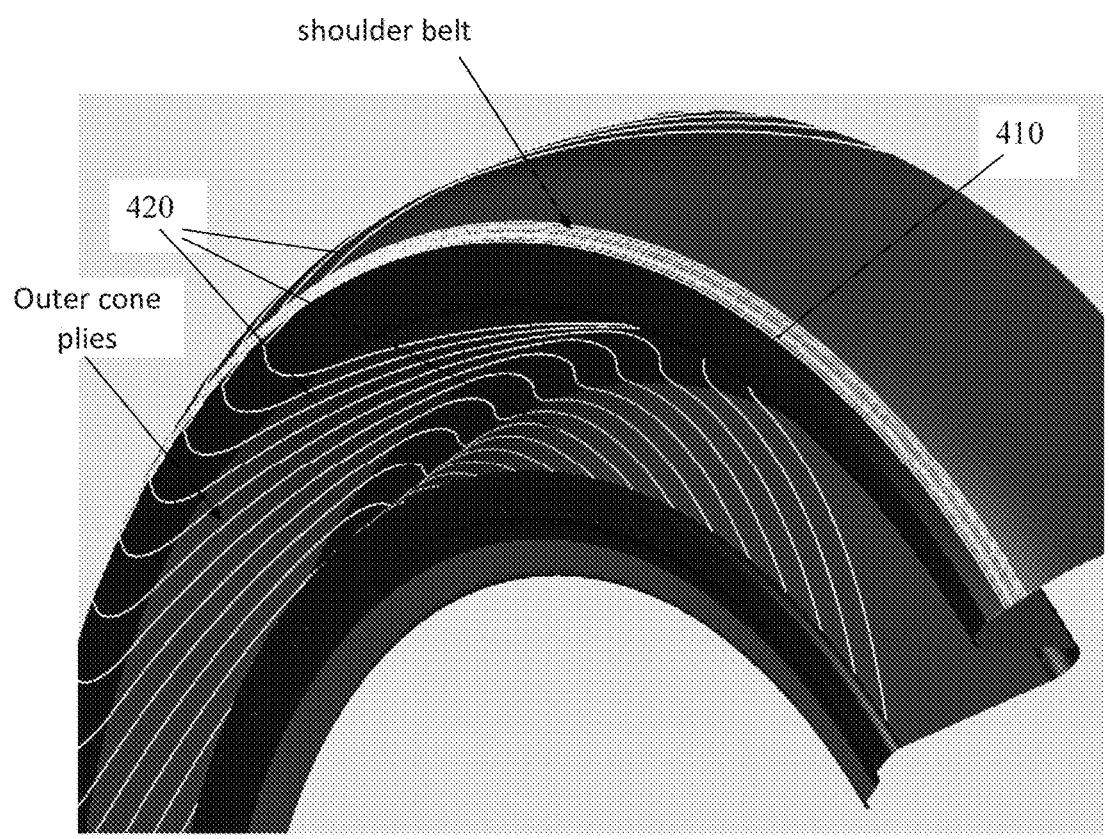
FIGS. 4A and 4B illustrate specific but not limiting example of the configuration of a support assembly embedded in the tire to provide the desired rigidity pattern.
Figure 4B:
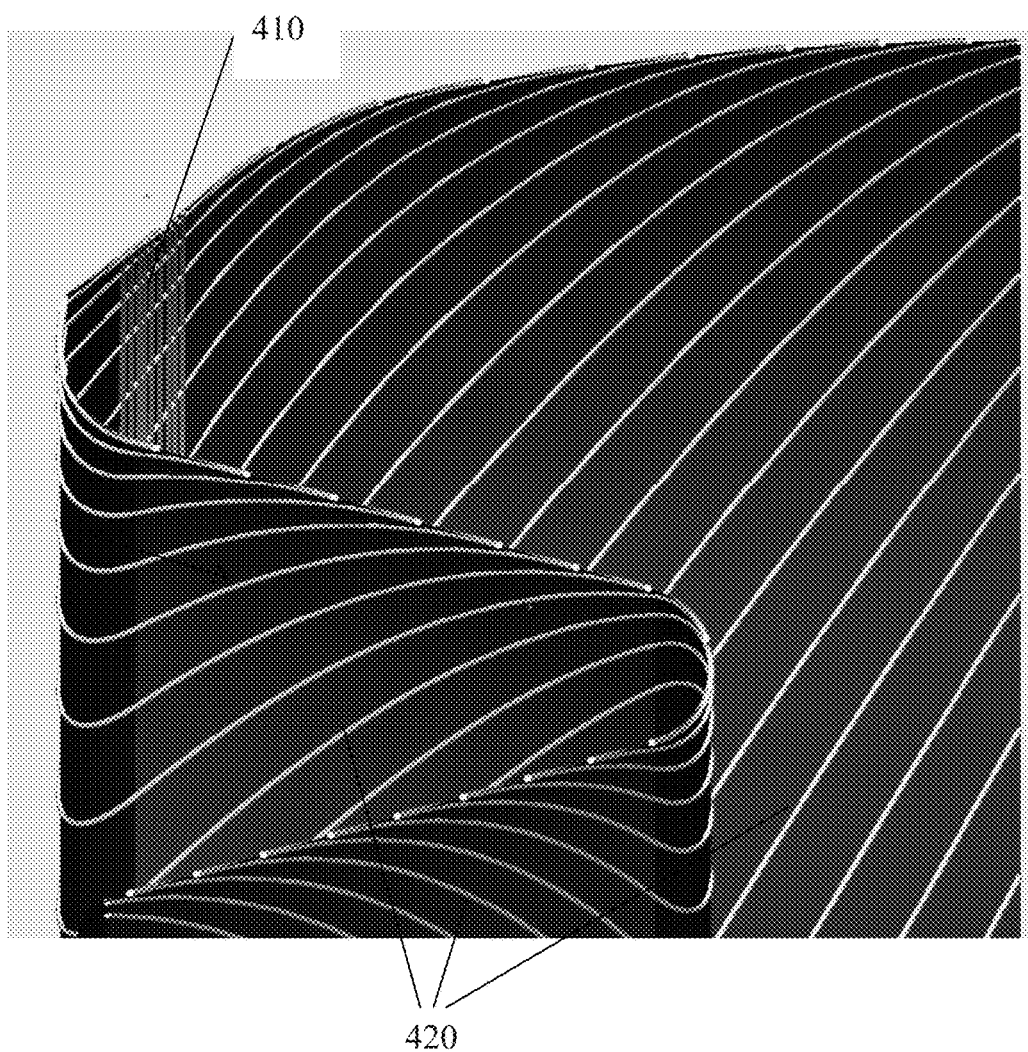

Reference is made to FIGS. 4A and 4B showing a specific but not limiting example of the tire 100 of the present invention. As shown in the figures, the sides if the groove as well as the surface engaging side are provided with the support elements. The support elements include a so-called shoulder belts extending along the surface engaging side close to the shoulder (170 in FIG. 3), inner cone plies and outer cone plies oriented with certain angular relation between them and with respect to the radial and circumferential axes. Specifically, the support structure comprises an arrangement of support elements consisting essentially of a plurality of first support elements and a plurality of second support elements, the plurality of first support elements being arranged in a circumferentially spaced-apart manner and extending between the rim-engagement sides 160 through the surface-engaging side 110 and the side walls 120A and 120B such that they are embedded in the inner side 150, outer side 130, and apex 180 of the at least one groove 140 in each side wall, the plurality of first support elements being oriented with a certain angular relation between them and with respect to both circumferential and radial axes of the tire, and the plurality of second support elements being embedded in the surface-engaging side 110 of the tire and extending along the surface-engaging side 110 parallel to the circumferential axis of the tire, the second support elements being provided as a pair of shoulder belts, the width between the outer edges of the shoulder belts parallel to the rotation axis of the tire being equal to the ground contact width of the tire. The arrangement of support elements consisting essentially of the first support elements and the second support elements provides a rigidity and flexibility pattern along the radial and circumferential axes of the tire, secures a circumferential length of the tire all along a cross-section of the tire defined by a path from each rim-engagement side 160 to the surface-engaging side 110, adds rigidity to the tire along the radial axis and maintains circumferential flexibility along the cross-section of the tire such that the cavity volume is prevented from expanding to its maximum theoretical volume and the at least one groove 140 in each side wall maintains a V-shaped cross-section when the cavity is not inflated.

As shown in the specific example of FIG. 4A, the rigidity pattern can be achieved by providing cables 410 and 420 embedded in the tire envelope, in the surface engaging side 110 and the outer and inner sides of the groove in the side wall 120A. FIG. 4B shows the same configuration of FIG. 4A from a different angle. It should be noted that the cables 410 are used to secure the circumferential length of the tire at the surface engaging side 110, close to the corner 170.

Figure 4C:
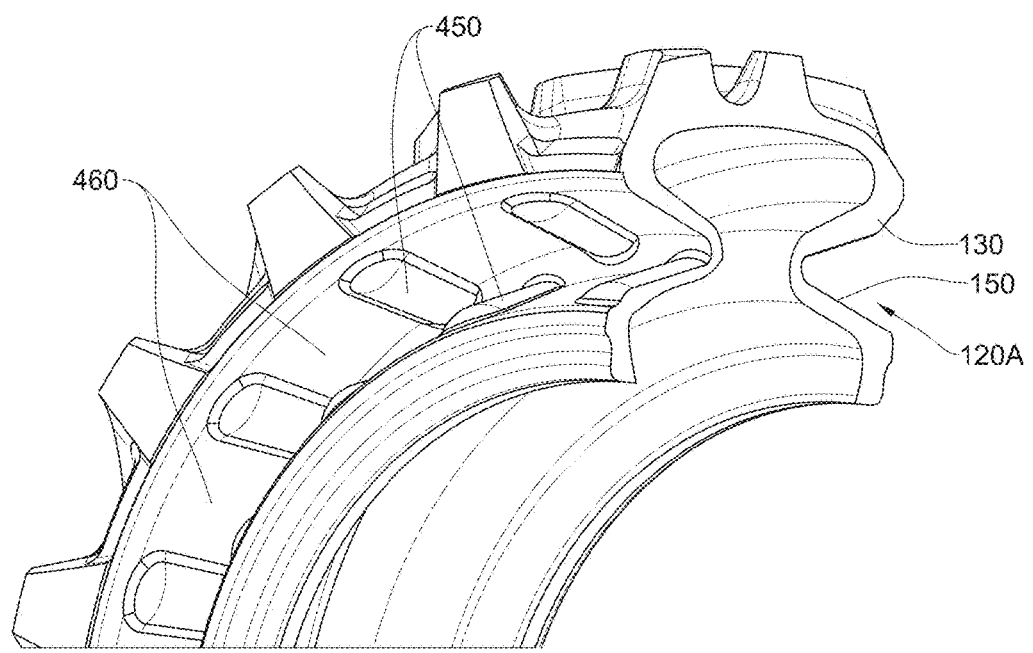
FIG. 4C exemplifies an additional rigidity pattern that can be used in the tire of the invention.

Reference is now made to FIG. 4C that illustrates another feature of the invention, which can additionally be used in any of the above-described examples. In some embodiments of the invention, the tire has additional rigidity pattern extending along the circumferential axes of at least one of the outer and inner sides of the groove 140 made in the side wall 120A. As can be seen in this specific not limiting example, the outer and inner sides 130 and 150 of the groove 140 have a varying thickness defining the rigidity patter. The varying thickness is formed by an array of spaced apart of relatively thick regions 450 spaced by thinner flexing regions 460, where the array extends along the circumferential axis of the respective side of the groove, and the regions area aligned substantially perpendicular to the tire plane (i.e. across the groove side). This configuration allows for achieving a desired circumferential rigidity pattern by, inter alia, appropriately selecting the pattern features, i.e. the thickness of different regions 450 and 460, and a distance between the locally adjacent thick regions 450 (i.e. the length of the thin flexing zones 460).

It should be noted, although not specifically illustrated, that the desired rigidity may be obtained by replacing the projecting (thicker) regions 450 by slots thus forming thinner regions spaced by thicker regions of the tire. In a different embodiment, such varying rigidity (rigidity/flexibility pattern) along the groove side may be achieved by forming the groove side with spaced-apart recesses/grooves and attaching/embedding there desirably rigid elements.

As already described above, the tire of the present invention should be rigid along its radial direction. In some embodiments of the invention, it is desirable to maintain the radial rigidity of the tire while at the same time keep circumferential flexibility. Therefore, the V-shaped groove might be strengthened in an uneven way. This can be achieved by providing/embedding in the tire a support structure which adds rigidity to the tire along the radial axis but at the same time enabling the tire to be sufficiently flexible in its circumferential direction.

Figure 5A:
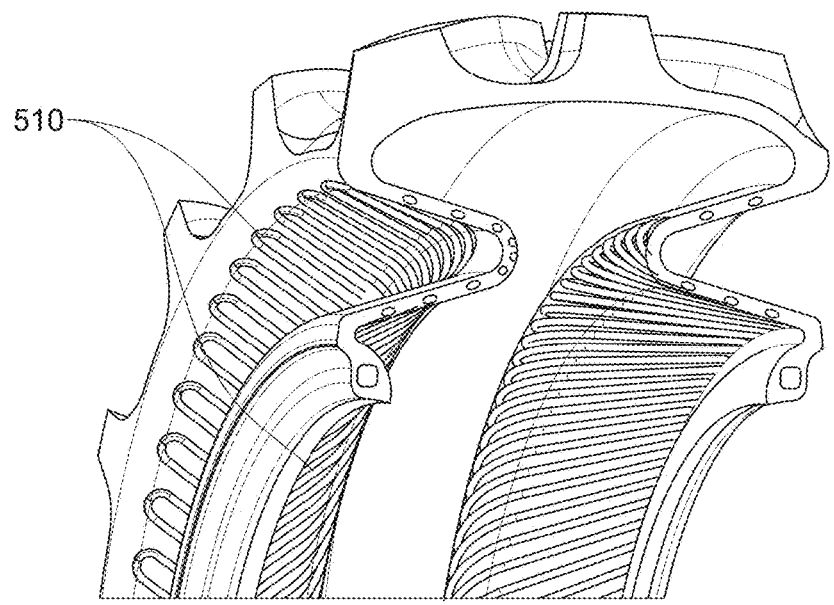
FIGS. 5A and 5B show another possible support assembly embedded in the tire to provide a desired rigidity and flexibility pattern.
Figure 5B:
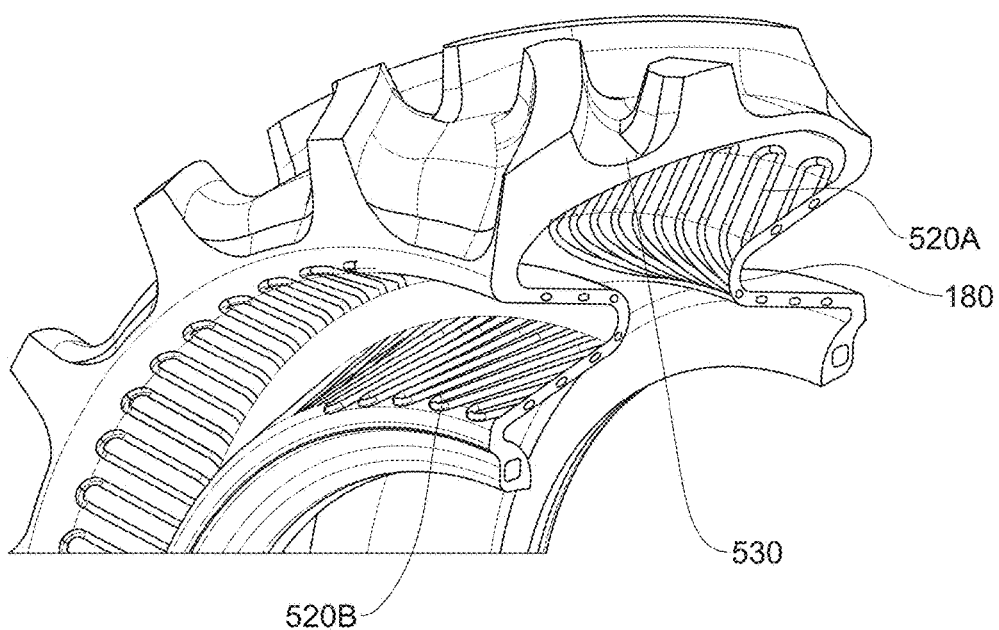

An example of obtaining this is by using a spring-like support structure as exemplified in FIGS. 5A and 5B. FIG. 5A illustrates one possible not limiting example of such spring-like support, in the form of a continuous spring 510 embedded in the outer and inner sides 150 and 130 of the groove 140. The continuous spring 510 extends across the entire groove 140, from the outer side 150 of the groove to its inner side 130 while passing through the apex 180. This configuration gives the groove and the whole tire the desired rigidity in the radial and circumferential directions while the rigidity in the circumferential direction is significantly lower than that in the radial direction, by this achieving the desired flexibility along the circumferential axis.

FIG. 5B exemplifies a somewhat different configuration of the support structure which is formed by separate spring-like support members, the first one 520A is embedded in the outer side 150 of the groove, and the second one is embedded within the inner side 130. In addition, a belt 530 is embedded in each of the inner and outer sides of the groove, closer to the groove apex 180. It should be noted that the configuration in FIG. 5A is probably more rigid in the radial axis than the configuration shown in FIG. 5B, enabling the design of different tires with different rigidities as may be required in specific situations.

It should be noted that the above exemplified springs may be substituted by any other suitable support elements made of substantially stiff material such as polymers, composite materials, and other alloys.

Figure 6A:
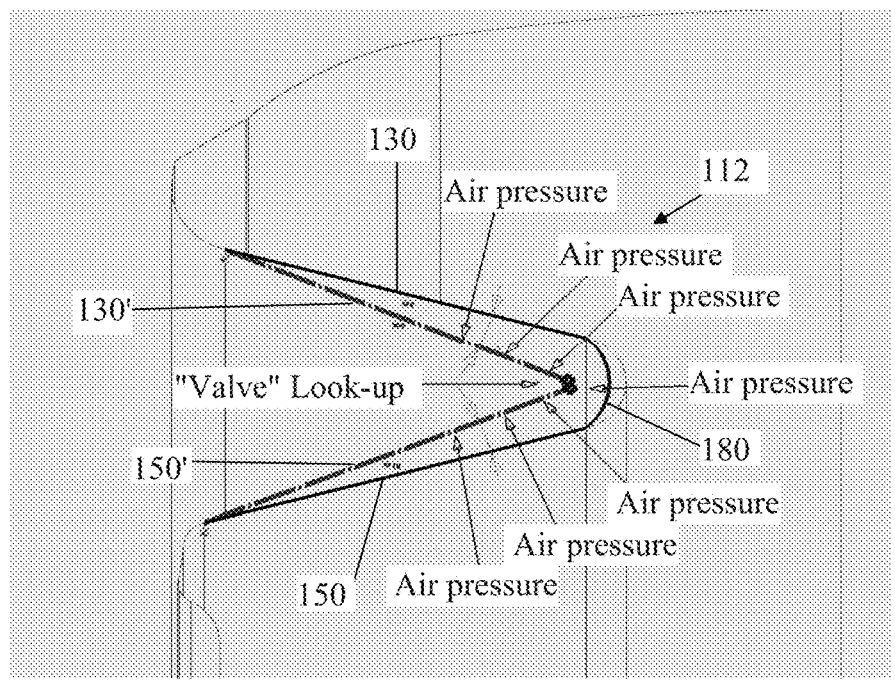
FIGS. 6A and 6B illustrate advantageous operational features of the tire of the present invention.
Figure 6B:
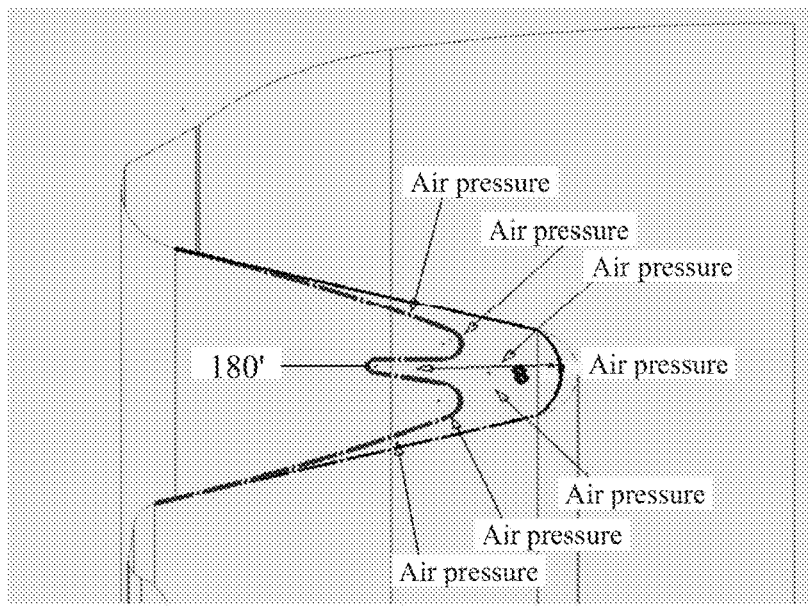

Reference is now made to FIGS. 6A and 6B illustrating some advantageous operational features of the tire 100 of the present invention. The tire is shown while being subject to pressure caused by inflation (filling gas in the cavity 112). In order for the tire 100 to hold the air pressure that exerts forces on the side walls 120A and 120B and pushes the outer side 130 and inner side 150 of the groove outside as exemplified by their positions 130' and 150' respectively, it is necessary to provide the side walls 120A and 120B with sufficient radial stiffness, otherwise the side walls may fold, collapse and bulge out.

As described above, the side walls have rigidity patterns that give the outer and inner sides of the groove the required rigidity to withstand the gas (air) pressure and prevent the side walls from collapsing, i.e. bulging out. One possible occurrence is exemplified in FIG. 6B in which the relatively flexible apex 180' bulges outside due to high pressure, whereas the rigidity applied to the outer and inner sides of the groove keep the tire from bursting and or collapsing.

As indicated above, the above described tire (i.e. with V-shaped grooves across its side walls and with a specific rigidity pattern/profile along the groove) may by itself present a vehicle's wheel assembly, or such tire may be mounted on a load-bearing arrangement to form together a wheel assembly. The wheel assembly may have two configurations: a rounded, non-deformed configuration in which a surface-engaging side of the tire is substantially circular and a deformed configuration in which the surface-engaging side of the tire is non-circular and has an extended portion that engages the surface. As also indicated above. the wheel assembly of the present invention in some embodiments thereof presents an improvement of the locomotion assembly of the kind disclosed in a co-owned international application No. PCT/IL2011/000115, which is incorporated herein by reference.

As also indicated above, the tire regions at the apexes 180 of the grooves 140, as well as corner regions 170 and 190 at opposite sides of the groove are relatively flexible. In a deformable wheel assembly utilizing such tire the flexible portions of the side walls (particularly at said apexes), considerable strains may develop. Such strains can be reduced by providing a specifically designed load-bearing arrangement. The load-bearing arrangement may be formed of discrete, dove-tailing elements, which are arranged in a manner to define two oppositely oriented substantially frustum-conical structures. The side walls of the tire-enclosure trace the frustum-conical surfaces and have thus an overall V-like cross-sectional shape with the apexes of the V-shapes of the two side walls facing one another. Such a locomotion/wheel assembly is at times referred to herein as "deformable wheel".

Figure 7:
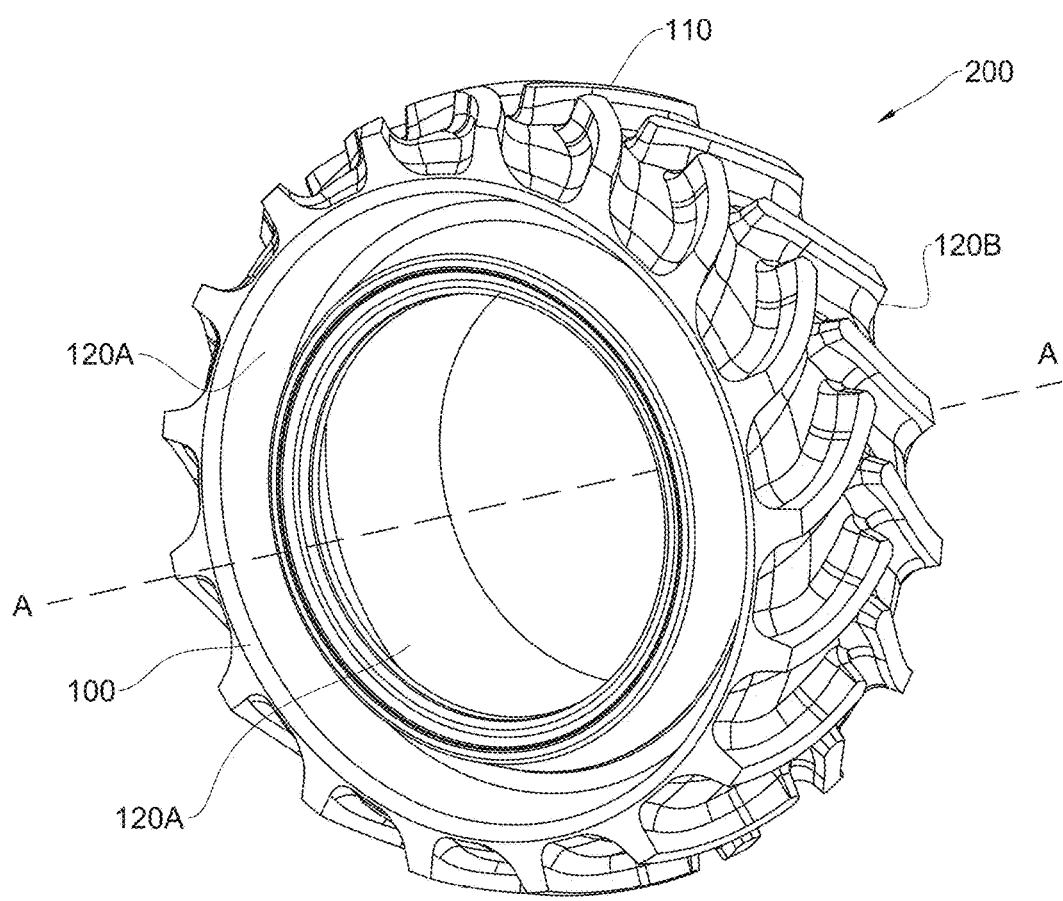
FIG. 7 is a perspective view of a deformable wheel, according to an embodiment of the invention.

FIG. 7 illustrates a deformable wheel generally designated 200 with a tire 100 formed around a wheel hub 104 (sometimes known as "rim") arranged about an axis A, which in use coincides with the wheel's axle. The tire 100 has a surface engaging side/member 110 (tread, having a circumferential surface) with an appropriate surface relief for firm gripping of the surface and has side walls 120A and 120B.

Figure 8:
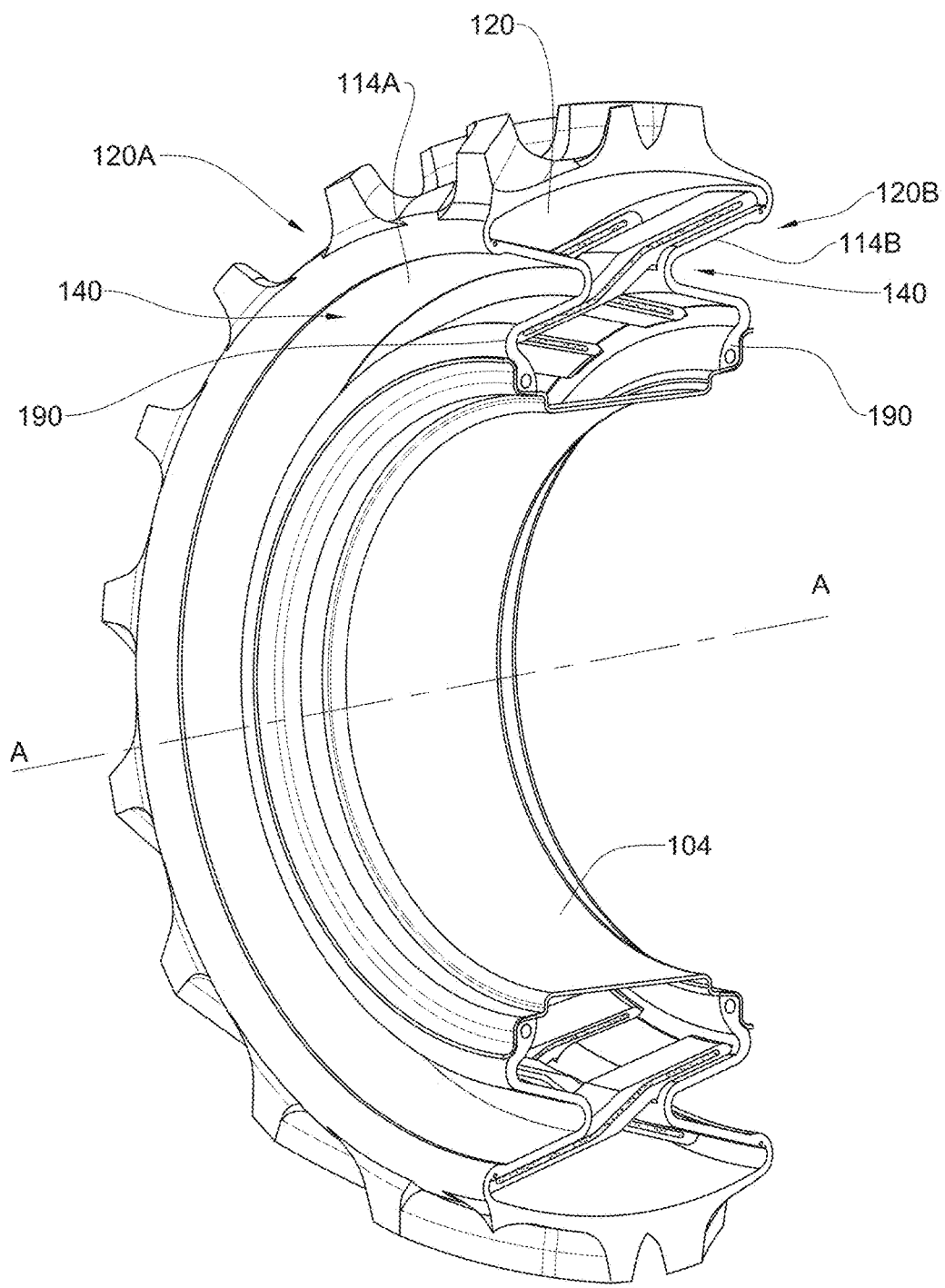
FIG. 8 is a perspective cross-sectional view of the wheel of FIG. 7.
Figure 9:
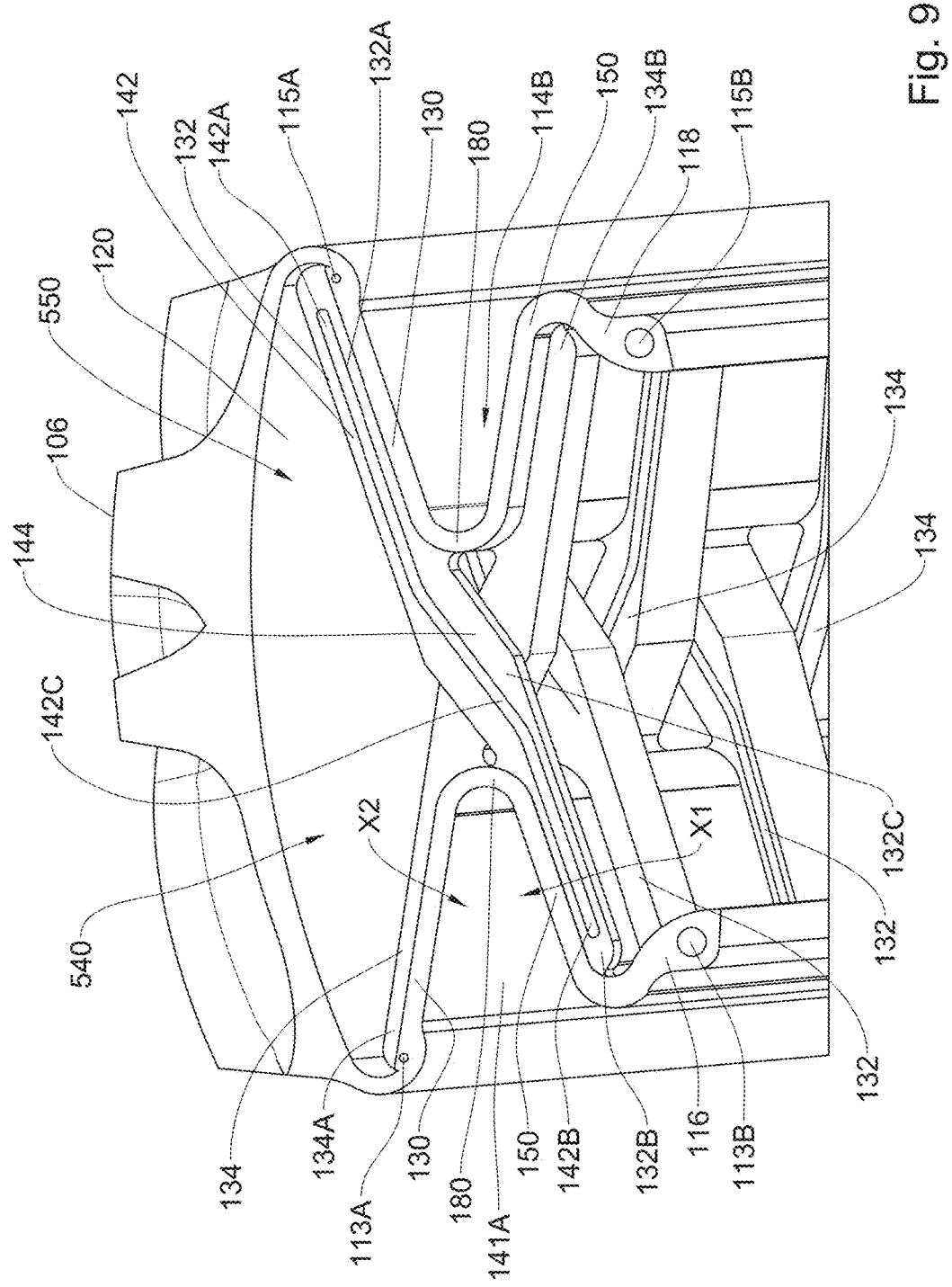
FIG. 9 shows a large cross-sectional view of a portion of the wheel with the internal load-bearing structure contained within the tire.

As can be seen in FIGS. 8 and 9, the side walls 120A, 120B have respective peripheral portions 114A, 114B defining a groove 140 with a generally V-shaped cross-section, ending with more central, respective, skirt portions 190, which are configured to form a gas-tight seal with the hub 104 (manner of forming gas-tight seal best seen in FIG. 2). The tire may be reinforced by metal, e.g. steel, fibers or cables, two of which: 113A and 113B, 115A and 115B, which are circumferential fibers embedded within the rubberized matrix of the tire, are illustrated in FIG. 9.

The surface engaging side 110, side walls 120A, 120B, and hub 104 generally define an enclosure 100 for holding pressurized gas, e.g. air. As described above, by change in gas pressure within the enclosure 100, the wheel can change its configuration from a generally circular one to a deformed configuration, in which an extended portion of the surface engaging member engages a surface.

As exemplified in the embodiment of FIG. 9, included within the tire is a load-bearing arrangement generally designated 540, which is formed by a plurality of support elements comprising elements 132 arranged in a first array in a spaced-apart manner; and a second array of elements 134 arranged in a second spaced-apart manner. The support elements provide desired rigidity pattern/profile along the V-shaped groove.

In this embodiment, elements 132 and 134 are identical and the arrays are substantially, slightly axially-shifted (shifted by about half of the angular displacement between adjacent elements in an array) mirror images of one another. Each array of elements define substantially frustum-conical structures that intersect one another at an intersection zone 550, whereby the elements 132 and 134 are arranged in a dovetailing manner with each of elements 132 and 134, being flanked by two elements 134 and 132, respectively.

Figure 10:
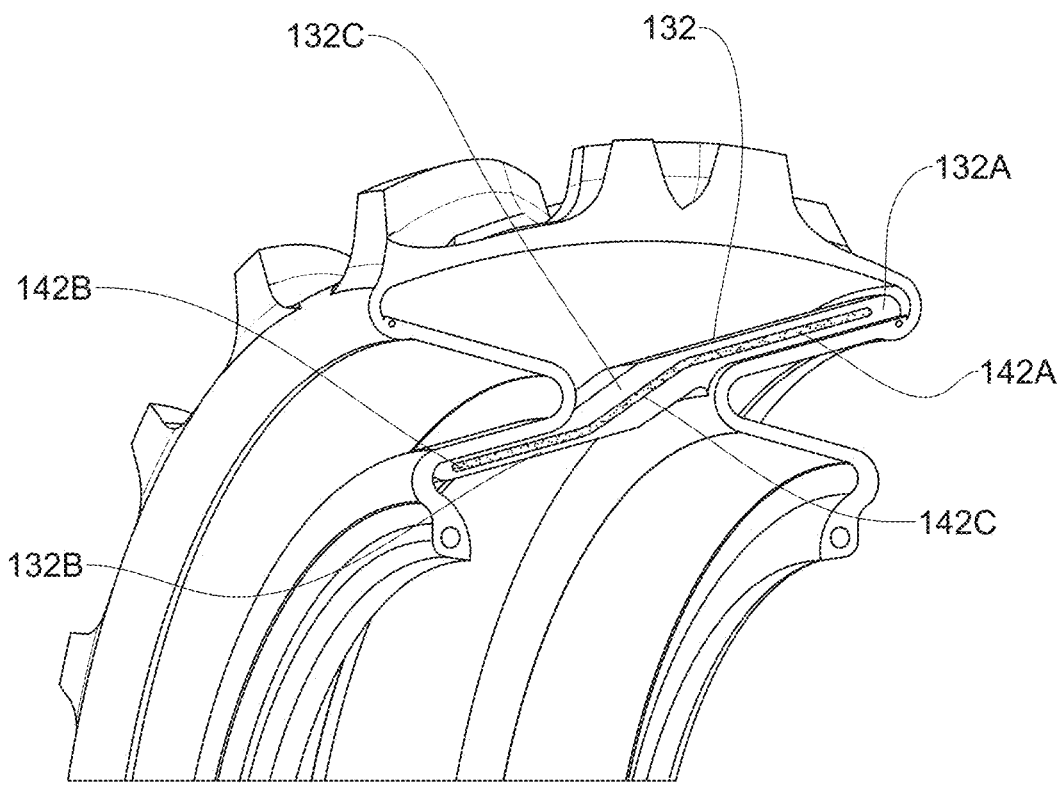
FIG. 10 is a cross-sectional perspective view of a portion of the tire illustrating the manner of association of a reinforcing element with side walls of the tire.

As can be seen in FIG. 9 and also in FIG. 10 (the latter representing in isolation element 132 to illustrate its structure and manner of association with the rubberized portion of the tire), each of elements 132, 134 has a generally curved side elevation. To facilitate easier reading, the description of the structure of each element will focus on element 132, which is substantially identical to that of element 134.

As can be seen in FIGS. 9 and 10, element 132 has a generally curved side profile and includes a metal rib 142 embedded in a rubberized matrix 144. The overall curved structure defines a first segment 132A and a second segment 132B, defined on two opposing sides of the point of intersection 550, and an intermediate section 132C. The metal rib thus has corresponding segments 142A, 142B and 142C. Segments 142A and 142B are located in parallel and spaced apart planes.

Upon deformation of a portion of the wheel, the first array of elements 132 and the second array of elements 134 pivot one against the other, in the direction of arrows $X_1$ and $X_2$. As a result, segment 134A of element 134 comes into closer elevation proximity to segment 132A of element 132; and the same applies with respect to segments 132A and 134B. Side wall portions 114A, 114B have respective first regions defining outer sides 130 of the groove, which trace the frustum-conical surface defined by segments 134A, 132A (and thus by themselves define a substantially frustum-conical surface); and similarly have regions 150 that also trace a frustum-conical surface defined by segments 132B, 134B, with intermediate regions 180 at the apex of the V-shaped cross-section.

Pivotal movement, as illustrated by arrows $X_1$ and $X_2$, also puts a strain on the rubberized portions of the tires, particularly at regions 180. However, in the arrangement shown herein, where the segments on each side of a point of intersection 550 are situated in different spaced apart parallel (slanted) planes, the strain is considerably reduced as compared to what would occur in the case of a substantially straight element of the load-bearing structure. Each of elements 132, 134, defined between substantially parallel opposite side faces, has surface contours permitting tight association with corresponding portions of regions 130, 150, 180, as is clearly illustrated in FIGS. 9 and 10.

In the embodiment illustrated in these figures, the elements are fixed to the side faces 120A, 120B through gluing or welding. By other embodiments of the invention, the association may be less tight, permitting some movement tolerance between opposite faces of the elements and the side walls.

Thus, the present invention provides a novel configuration of a surface vehicle tire/wheel, which incorporates a different approach for providing a desired suspension assembly within the tire formed by the tire geometry and material characteristics. The suspension assembly is achieved by provision of substantially V-shaped grooves (in cross section) in the side walls of the tire envelope and desired rigidity and flexibility parameters of different regions/sides of the groove, and possible also of the surface engaging side of the tire.

The invention claimed is:

1. A pneumatic tire for a wheel assembly of a surface vehicle, said tire comprising an envelope structure which by its inner surface encloses a cavity when the tire is connected to a wheel hub of the wheel assembly, said envelope structure comprising:

an outer side, being a surface-engaging side of the tire having a circumferential surface, opposite outer edges of the surface-engaging side parallel to the rotation axis of the tire forming shoulders, opposite side walls which are integral with and extend from said surface-engaging side, the side walls by their free ends defining an inner, rim-engagement side of the tire by which the tire is connectable to the wheel hub, and a support structure embedded in said envelope structure, wherein each of the opposite side walls comprises a surface pattern extending between the surface-engaging side and the rim-engagement side and defining a surface relief in the form of at least one groove having a V-shaped cross-section defined by inner and outer sides of the groove intersecting at an apex of the groove, the outer side of the outermost groove being connected to the surface-engaging side, and the inner side of the innermost groove being connected to the rim-engagement side, and the support structure comprises an arrangement of support elements consisting essentially of a plurality of first support elements and a plurality of second support elements, the plurality of first support elements being arranged in a circumferentially spaced-apart manner and extending between the rim-engagement sides through the surface-engaging side and the side walls such that they are embedded in the inner side, outer side, and apex of the at least one groove in each side wall, said plurality of first support elements being oriented with a certain angular relation between them and with respect to both circumferential and radial axes of the tire, the plurality of second support elements being embedded in the surface-engaging side of the tire and extending along the surface-engaging side parallel to the circumferential axis of the tire, said second support elements being provided as a pair of shoulder belts, the width between the outer edges of the shoulder belts parallel to the rotation axis of the tire being equal to the ground contact width of the tire, wherein said arrangement of support elements consisting essentially of the first support elements and the second support elements provides a rigidity and flexibility pattern along the radial and circumferential axes of the tire, secures a circumferential length of the tire all along a cross-section of the tire defined by a path from each rim-engagement side to the surface-engaging side, adds rigidity to the tire along the radial axis and maintains circumferential flexibility along the cross-section of the tire such that the cavity volume is prevented from expanding to its maximum theoretical volume and the at least one groove in each side wall maintains a V-shaped cross-section when the cavity is not inflated.

2. The pneumatic tire of claim 1, wherein the at least one V-shaped groove in each side wall is one V-shaped groove in each side wall and the rigidity and flexibility pattern is such that the regions of the tire at the apex of each V-shaped groove and at corners defined by the connection between each groove with the surface-engaging side of the tire and the connection between each groove and the respective rim-engagement side of the tire have smaller rigidity and higher flexibility than at the other regions of the side walls of the tire.

3. The pneumatic tire of claim 1, wherein said rigidity and flexibility pattern is such that in each V-shaped groove the inner side of the groove has higher rigidity than the outer side of the groove along both the radial and circumferential axes of the tire.

4. The pneumatic tire of claim 1, wherein said rigidity and flexibility pattern is further formed by varying thickness of at least one of the outer and inner sides of each V-shaped groove.

5. A wheel assembly comprising the pneumatic tire of claim 1 connected to the wheel hub.

6. A surface vehicle comprising the wheel assembly of claim 5.

* * * * *